United States Patent [19]

Günthner

[11] Patent Number: 4,820,329
[45] Date of Patent: Apr. 11, 1989

[54] METHODS FOR THE BATCHWISE PRODUCTION OF GLASS

[75] Inventor: Franz Günthner, Mainz-Lerchenberg, Fed. Rep. of Germany

[73] Assignee: Schott Glaswerke, Mainz, Fed. Rep. of Germany

[21] Appl. No.: 936,938

[22] Filed: Dec. 1, 1986

Related U.S. Application Data

[63] Continuation of Ser. No. 735,404, May 17, 1985, abandoned.

[30] Foreign Application Priority Data

May 17, 1984 [DE] Fed. Rep. of Germany ....... 3418284

[51] Int. Cl.$^4$ ............................................... C03B 5/14
[52] U.S. Cl. ...................................... 65/134; 65/135; 65/178; 65/347
[58] Field of Search ...................... 65/32, 71, 134, 135, 65/178, 324–325, 333, 335, 340–342, 347

[56] References Cited

U.S. PATENT DOCUMENTS 1,907,361  5/1933  Moorshead et al. .................. 65/340
2,007,755  7/1935  Ferguson ............................. 65/134
2,641,454  6/1953  Labino ................................. 65/134
3,466,160  9/1969  Keefer ................................. 65/134
3,754,886  8/1973  Richards et al. .................... 65/134
3,819,350  6/1974  Pellet et al. ......................... 65/134
3,917,479  11/1975  Sayce et al. ........................ 75/10 R
4,247,320  1/1981  Banal et al. ......................... 65/347

Primary Examiner—Arthur Kellogg
Attorney, Agent, or Firm—Millen & White

[57] ABSTRACT

A process for the batchwise production of glass performs melting, refining and discharging steps in electrically heated identical vessels, wherein at least the refining step is conducted during rotation of a vessel, and discharging of the refined glass takes place while the vessel is at rest. By using several vessels, which are either mobile or which are connected with one another by movable spouts, feeding of molten glass to a distributing channel for further processing is done continuously. Vessels according to the invention have electrodes for heating purposes; outlet port sealing arrangements; and ports for applying over-pressure or a vacuum to control glass exit speed. Blast pipes may be disposed in proximity with outlet ports in order to improve flow of the glass melt by introducing blasts of an inert gas.

13 Claims, 16 Drawing Sheets

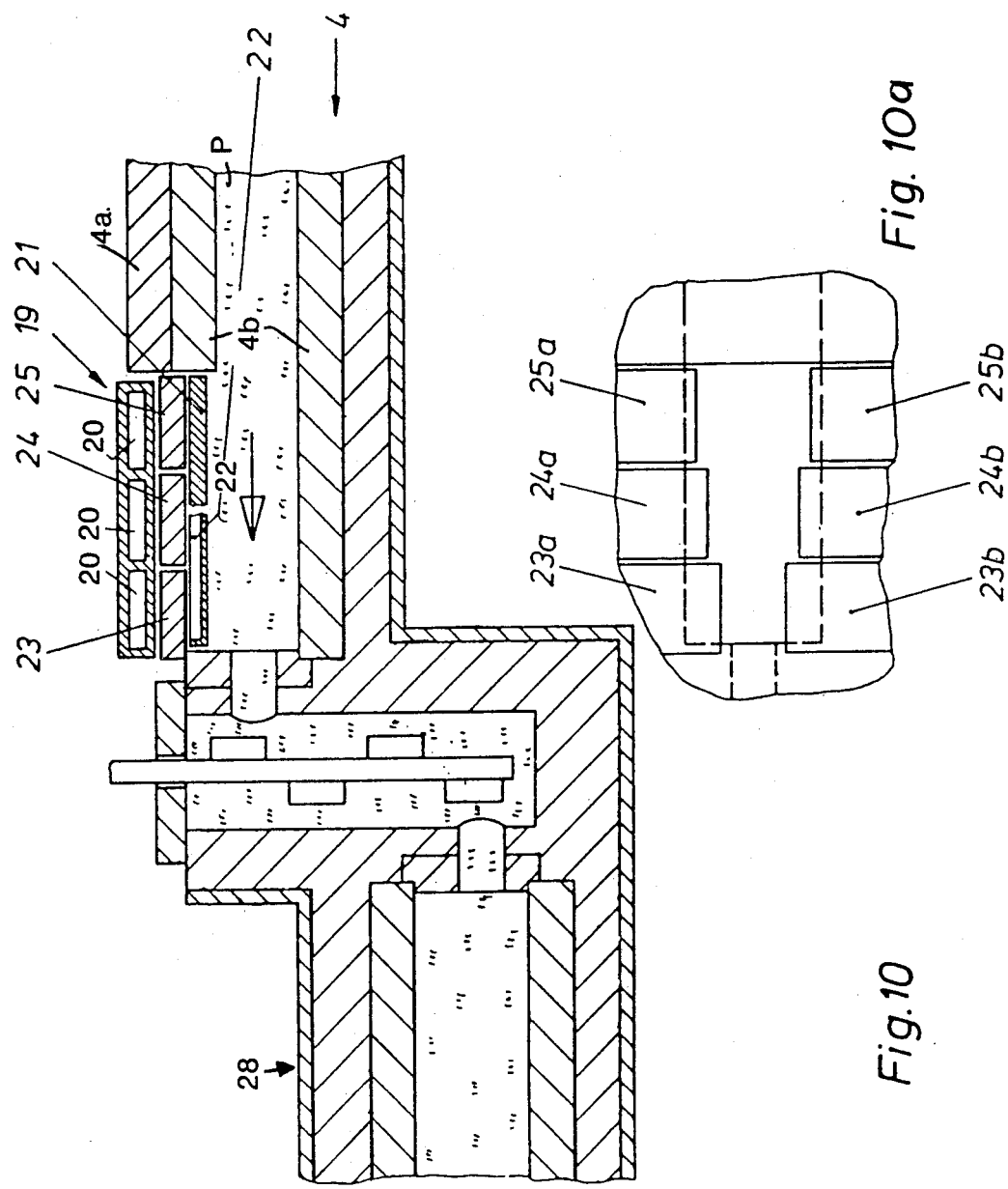

METHODS FOR THE BATCHWISE PRODUCTION OF GLASS

This is a continuation, of application Ser. No. 735,404 filed May 17, 1985 now abandoned.

BACKGROUND OF THE INVENTION (1) Field of the Invention The invention relates to processes and apparatus for the batchwise production of glass by melting, refining and discharging the glass, and to a vessel used to perform the processes.

(2) Technical Considerations and Prior Art

An essential step in glass production is feeding large amounts of molten, bubble-free glass continuously to processing machines. The basic theory underlying these processes is set forth in D. R. Uhlmann et al (1983), Glass-Science and Technology, Academic Press, Inc., pages 1-44.

It is known to effect melting, refining and discharging of glass in continuous troughs so that melting, refining and processing takes place simultaneously. In these troughs a melting system is connected continuously from a mixture feed point up to a feeder outlet by means of a fixed channel system. In the region of the trough proper, i.e. where the melting, refining and cooling elements are located, it is necessary to interrupt operation of the process to change individual parts or perform repairs.

Since the individual processes merge in the trough, the residence time spectrum of the melt is very large, and flow relationships cannot be separately controlled. For this reason, large structural units with large safety margins are required. As a consequence, the throughput of molten glass per unit volume ($m^3$) of the melt vessel is low and controlling of individual processes as well as localizing disturbances is difficult. Moreover, heat losses are considerable and can be reduced further only with great difficulty.

It is also conventional to melt glass in a laboratory in platinum crucibles. In laboratories, heat is fed to the melt from the outside over the entire surface of the melt and of the crucible. However, with this approach, the heat-transfer surface per unit volume of melt is large and the exit route for gas bubbles is small. The melting output/unit volume of melt is, therefore, very large. A large melting output has considerable economical advantages. However, such advantages become significant only in melting large quantities of glass. Transferring the laboratory method to installations with large throughput while maintaining the large melting output/unit volume of melt is impossible. This is because in large installations, only the surface of the melt, rather than that of the crucible, can be exploited for heat transfer to the melt and, inter alia, the heat-transfer surface/unit volume of melt becomes smaller while the exit route for the bubbles becomes larger. Consequently, refining time becomes longer.

Processes are employed in the prior art which include direct electric resistance heating, but here again, in continuous operation, large safety volumes are necessary in order to avoid entrainment of unmolten and unrefined glass. Heat transport to the mixture lying on the melt takes place by convection and radiation from molten glass flowing along therebelow. This flow has a large velocity spectrum, but the portion of the stream having the highest velocity must flow so slowly that it inadequately entrains the molten glass. In summary, the disadvantages of continuous operation employing direct electric heating are as follows:

(1) large residence time spectrum for individual particles resulting in different conditions for reactions, mass transfer processes, and heat exchange processes;

(2) unreliability, due to failure of the entire installation upon failure of one element;

(3) fixed capacity, and (4) difficulty in converting to other modes of production or process operation.

In order to shorten the melting or refining operation and thus increase throughput, processes have been employed in the prior art wherein at least the refining step is performed in a rotating vessel. For example, it is known from German Patent DOS No. 2,214,157 to introduce the already molten, but not yet refined glass continuously into a rotating tank. Depending on the number of revolutions, the glass is refined within a fraction of the time period required by conventional procedures. Subsequently, the finished melt is withdrawn while the vessel is in rotation. A disadvantage of this process resides in the fact that there is no possibility for transferring the glass, with the vessel in rotation, into a stationary vessel without creation of bubbles. The exiting stream has great rotational energy, but no strength. It cannot fall freely over relatively large distances without breaking away into a discontinuous stream. If the stream is collected immediately after exiting, great shearing forces arise so that bubbles are twisted into the stream. Moreover, melting and refining in the same vessel cannot be done.

German Patent DOS No. 2,259,219 discloses a high-temperature furnace equipped with plasma or arc heating and is operable either continuously or discontinuously. The melting step is performed with rotation of the crucible furnace whereby the melt forms a liquid wall coating in the form of a rotational paraboloid on the interior surface of the furnace. The thus-molten glass is substantially free of bubbles so that no subsequent refining step is required. However, this process has the disadvantage that only small amounts of glass can be melted since energy is supplied merely through the free surface of the melt. Consequently, with these processes it is difficult to supply heat for large batches of glass.

U.S. Pat. No. 2,006,947 discloses an oil-heated or gas-heated furnace wherein melting and refining take place continuously or discontinuously in a thin mixture or in a glass layer located on the paraboloid-shaped inner face of a revolving, funnel-shaped container. The glass discharge step is executed continuously or discontinuously. This process has several disadvantages. When heating with gas or oil, the energy density in the melt, required for large outputs, cannot be achieved because energy can only be supplied by way of the free surface of the melt. The large free surface promotes vaporization which, in turn, gives rise to schlieren effects. In the described arrangement, the mixture can be introduced and melted only while the container is in rotation, because if the container is at a standstill, the mixture will flow downwardly in a limited strip covering the internal surface so rapidly that the time available will not suffice for melting or refining. Since the discharge opening is open at all times, the glass content of the container can only be varied within small limits solely by a change in the number of revolutions. Moreover, no blowing or stirring is possible with this approach. These problems all arise when discharging from the rotating vessel disclosed in this patent.

SUMMARY OF THE INVENTION

In view of the aforementioned difficulties, it is an object of the present invention to provie a manufacturing process for glass wherein it is possible to process large quantities of glass while avoiding the disadvantages of continuous melting and refining and while still permitting continuous further processing of the glass. Another object of this invention resides in configuring a vessel suitable for use in this process, while still another object resides in arranging apparatus to perform the process.

The instant invention contemplates the steps of conducting melting, refining and discharging operations in either one vessel or in several identical vessels. The vessels are heated electrically, and at least the refining operation is performed during rotation of the vessel. Moreover, discharging of the refined glass from the vessel occurs when the vessel is at rest and transferring of molten glass to further processing stations is continuous.

Preferably, several vessels are utilized simultaneously in performing the aforedescribed process; the melting and refining being performed either in a single vessel or in separate vessels.

Since the melting step generally takes longer than the refining step, refining in separate vessels is conducted in at least two vessels with each refining vessel being supplied with molten glass by two melting vessels. Communication between melting and refining vessels can be established by fixed or movable spouts. In order to shorten the refining process, refining is conducted while the vessel is being rotated. In order to avoid bubbles from entering the melt during discharge, as it occurs when rotating vessels are being emptied due to twisting of the stream, rotation of the vessel is stopped during discharge. As an additional measure, the efflux speed of the glass is controlled by application of either pressure or a vacuum.

Discharge takes place into a spout connected to a distributing system. In accordance with one embodiment of the invention, this spout is movable so that with the use of fixed vessels the spout is swung from beneath one vessel to beneath the next successive vessel. In accordance with another embodiment of the invention, a fixed spout is utilized with movable vessels which are moved over the spout for emptying. After the emptying, each vessel is sealed either mechanically by means of a gate valve, or the like, or by freezing the melt with cooling pipes disposed in the outlet port.

During changing of the vessels or during swinging of the spout from one vessel to another, the glass flow would ordinarily be interrupted for a short time, causing the glass level in the distributing system to drop. Since the processing machines downstream of the vessels are operating continuously, the glass level must be maintained at a constant height. According to the instant invention, this is accomplished by collecting the amount of glass required during the interruption in an equalizing vessel arranged above the distributing system prior to interrupting the glass flow, and then dispensing this glass into the vessel during interruption of the glass flow.

This invention further contemplates including in the distributing system at least one cooling device in order to cool the melt to processing temperature.

Vessels constructed according to this invention have electrodes positioned on the bottoms thereof and arranged in such a way that energy utilization is optimally exploited. Moreover, the vessels are rotated during refining so that higher energy densities than possible heretofore is achieved. For discharging, these vessels are either moved over a discharge spout or are inclined about a horizontal axis so that, if refining takes place in a separate tank, the latter can be filled while rotating. The inclined arrangement and rotation of the vessel prevents falling through and efflux of the glass during filling and refining.

In order to seal the outlet port, the vessel uses either a gate valve or cooling pipes which are used to freeze the melt.

BRIEF DESCRIPTION OF THE DRAWINGS

The invention will be described in greater detail below with reference to exemplary embodiments shown in the drawings wherein:

FIG. 10 is a side view showing vertical section through a cooling device and associated feeding spout;

FIG. 10a is a top view of the cooling device of FIG. 10 showing slides;

DESCRIPTION OF THE PREFERRED EMBODIMENTS

Figure 1A:
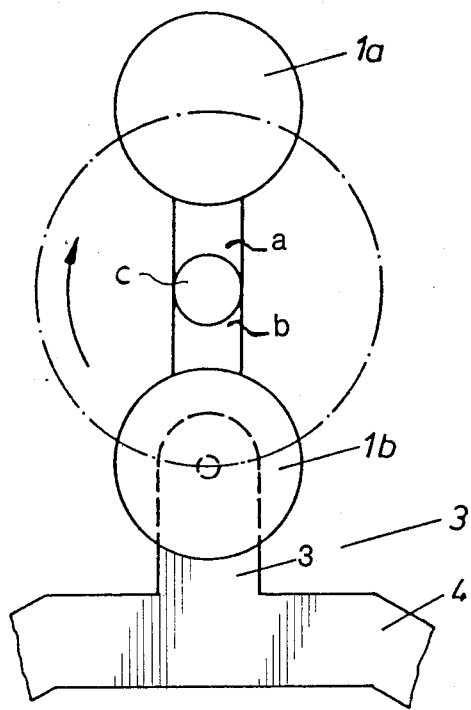
FIGS. 1a–1c are schematic top views showing arrangements of mobile vessels with a fixed spout.
Figure 1B:
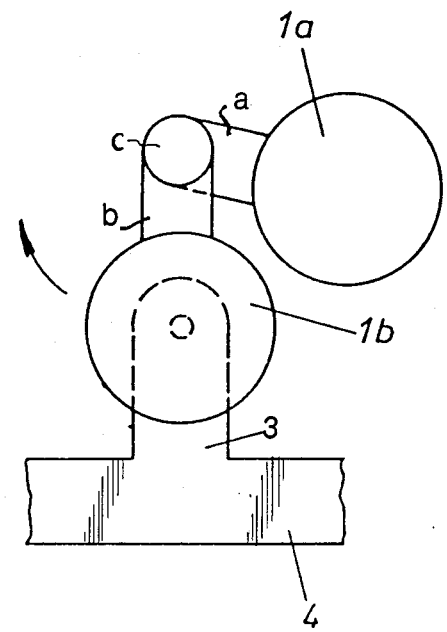
Figure 1C:
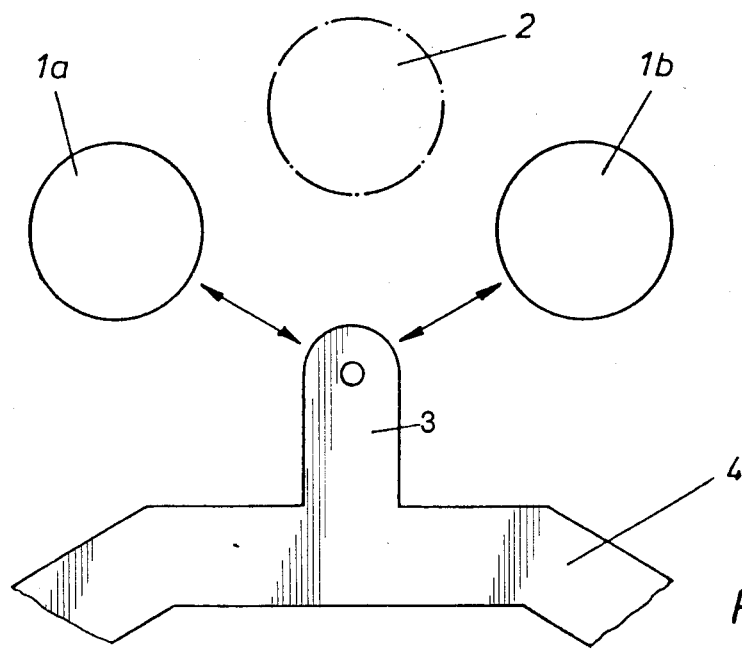

Referring now to FIGS. 1a–1c of the drawings, vessels 1a and 1b are mounted on arms a and b to pivot about pivot c over fixed spout 3, which spout is connected to a distributing system 4. The vessels 1a and 1b can either be moved along a circular route as illustrated in FIGS. 1a and 1b, or in the alternative, they may be moved alternatingly forwards and backwards with respect to the spout 3. FIG. 1c shows an arrangement wherein a replacement tank 2 is disposed between the vessels 1a and 1b. The tank 2 is utilized in case one of these two vessels 1a, 1b becomes inoperative, so that one does not have to interrupt the operation of the process if one of the vessels is not functioning. In essence, Figs. 1a–1c disclose an embodiment of the invention wherein vessels utilized for containing molten glass are moved with respect to a fixed spout.

Figure 2:
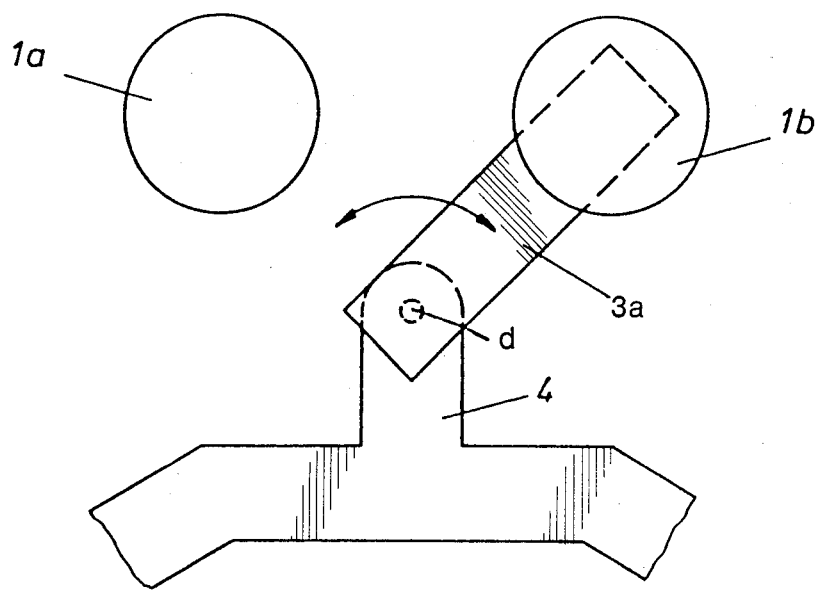
FIG. 2 is a schematic top view showing an arrangement of immobile vessels with a pivoting spout.

Referring now to FIG. 2, an embodiment disclosing an arrangement of two fixed vessels 1a and 1b is shown with the spout 3 configured as a trough 3a being arranged to pivot about a pivot d.

Figure 3:
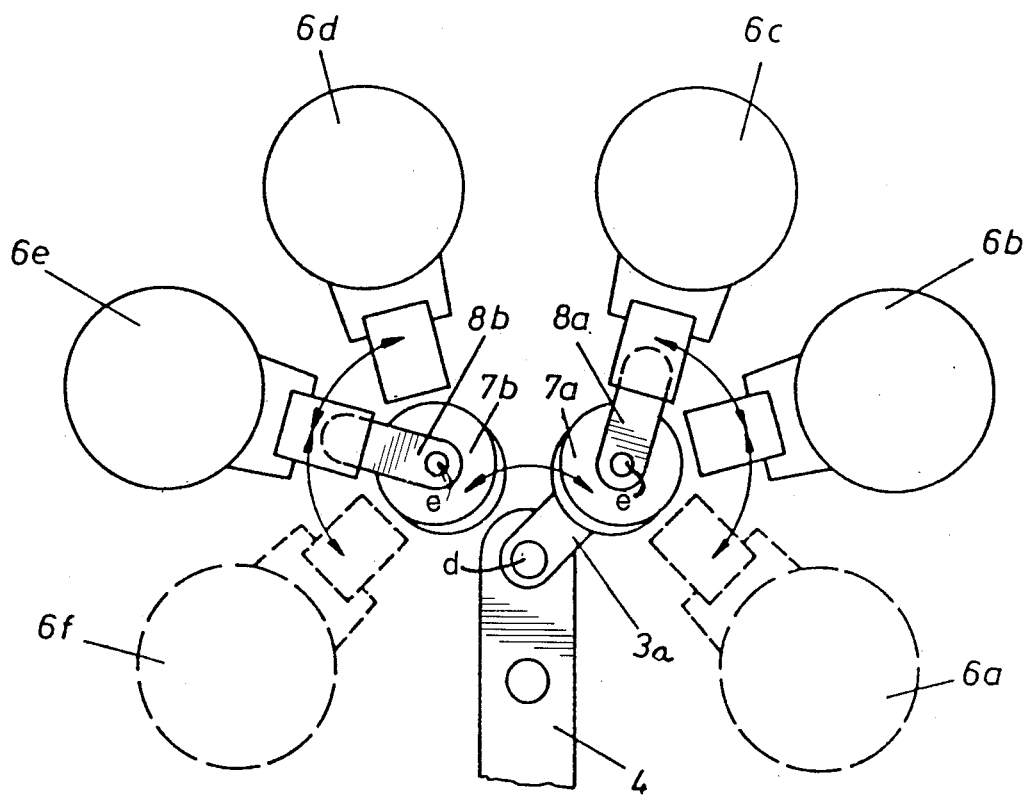
FIG. 3 is a top view showing an arrangement of fixed melting and refining vessels with movable spouts.

FIG. 3 shows an arrangement of six fixed melting vessels 6a, 6b, 6c, 6d, 6e and 6f in association with two separate, rotating refining vessels 7a and 7b. A movable spout 8a pivoting about point e transfers molten glass from melting pots 6a, 6b and 6c to refining vessel 7a while a movable spout 8b pivoting about point e transfers molten glass from melting pots 6d, 6e and 6f to refining vessel 7b. A pivoting connecting trough 3 transfers the refined glass from the refining vessels 7a and 7b to the distributing channel 4 which corresponds to the distributing channel 4 shown in FIGS. 1 and 2. The refining vessels 7a and 7b are filled while revolving and are rotated until the refining step is complete. Upon completion of the refining step, rotation of the refining vessels 7a and 7b is stopped and the refining vessels are emptied while at rest.

Figure 4:
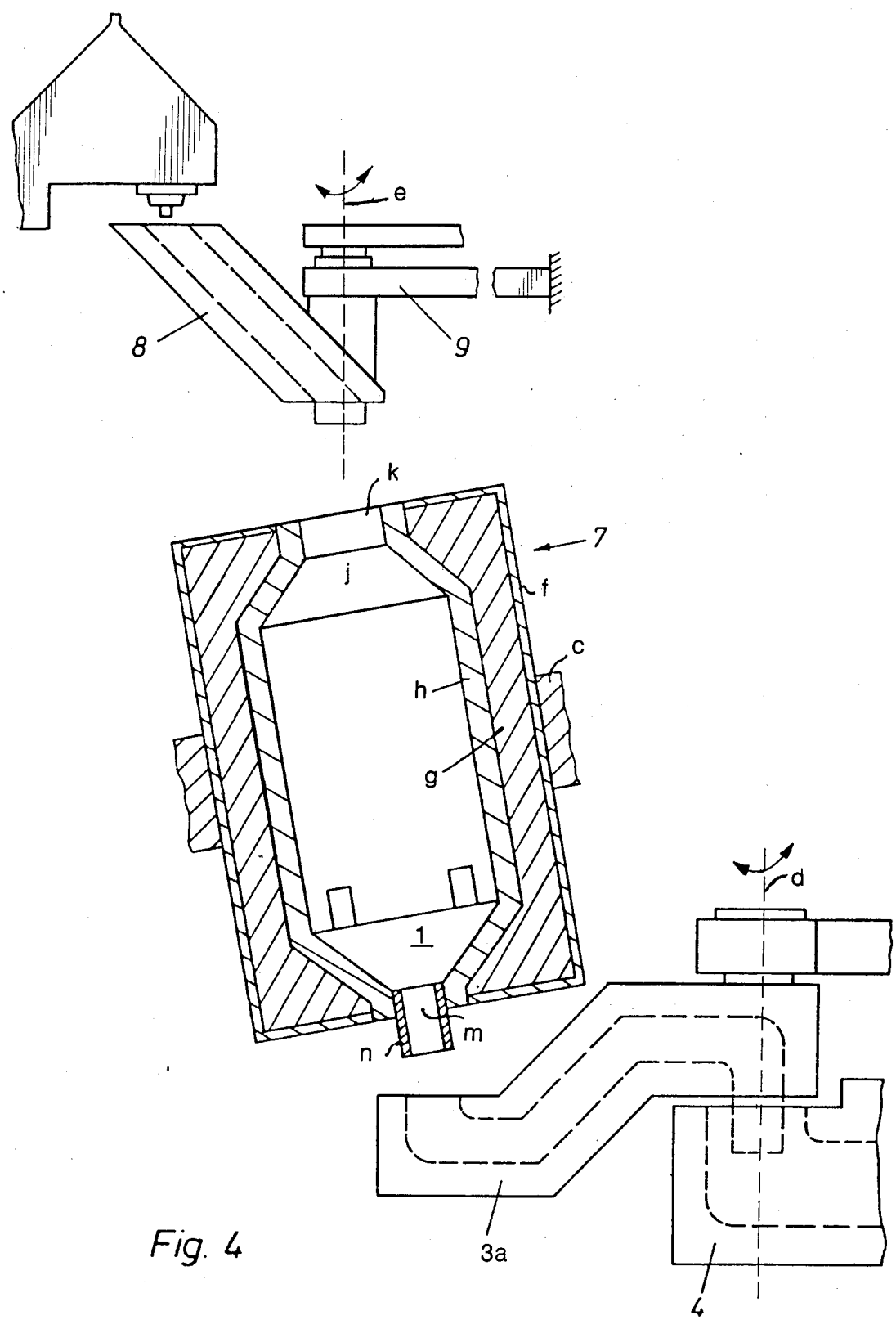
FIG. 4 is a top view showing a verticle section through an inclined vessel with aligned spouts.

Referring now to FIG. 4, there is shown a corresponding arrangement with an inclined refining vessel 7, the pivoting spout 3, and a single illustrated connecting trough 8. The connecting trough 8 rotates about axis e by means of a conventional pivot drive means 9 to the individual melting vessels 6a–6c or 6d–6f (See FIG. 3). The drive means can be belts.

FIGS. 2, 3 and 4 illustrate a second basic embodiment of the invention wherein the vessels 6 and 7 are fixed while the trough 3a and spout(s) 8 are movable.

Considering the inclined refining vessel 7 shown in FIG. 4 more specifically, it is seen that the vessel is configured with a metal casing f lined with an insulating layer g made of porous $ZrO_2$ or $Al_2O_3$, respectively. Within the insulating layer g there is a lining of refractory material h. The interior of the vessel 7 converges at its inlet end j to an inlet opening k and converges at its outlet end 1 to end outlet opening m which is lined with a metal sleeve n.

The vessel 7 may be driven to rotate by a conventional mechanism such as meshed gear teeth, or a chain, or perhaps a belt associated in a conventional manner with a member o, which member o may be, for example, a disc having a toothed perimeter and supported on bearings. This structure is conventional and may be suitably designed by any person familiar with the art of rotating devices such as vessels.

There are a plurality of melting vessels 6 for each refining vessel 7 in the embodiment of FIG. 3 because the melting step takes longer than the refining step. Likewise, there are a plurality of refining vessels for a single distribution system because refining generally takes longer than distribution. With the arrangement of FIG. 3, the down time due to one of the components 4, 7 or 6 waiting for a charge of molten glass is minimized. Moreover, one of the components may be repaired or changed without stopping the production process.

Figure 5A:
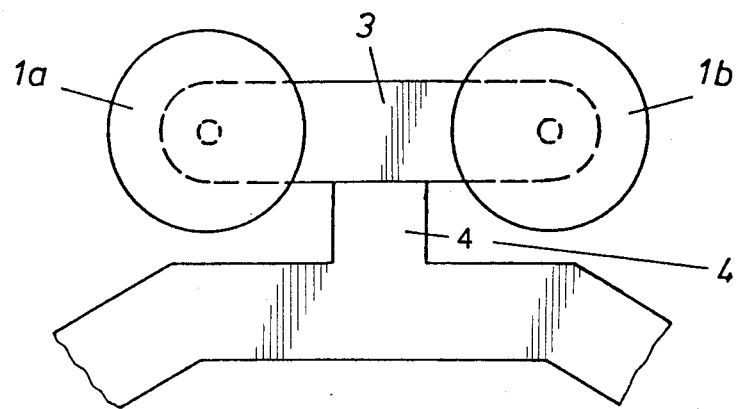
FIGS. 5a and 5b are schematic top views showing an arrangement of immobile vessels with fixed spouts.
Figure 5B:
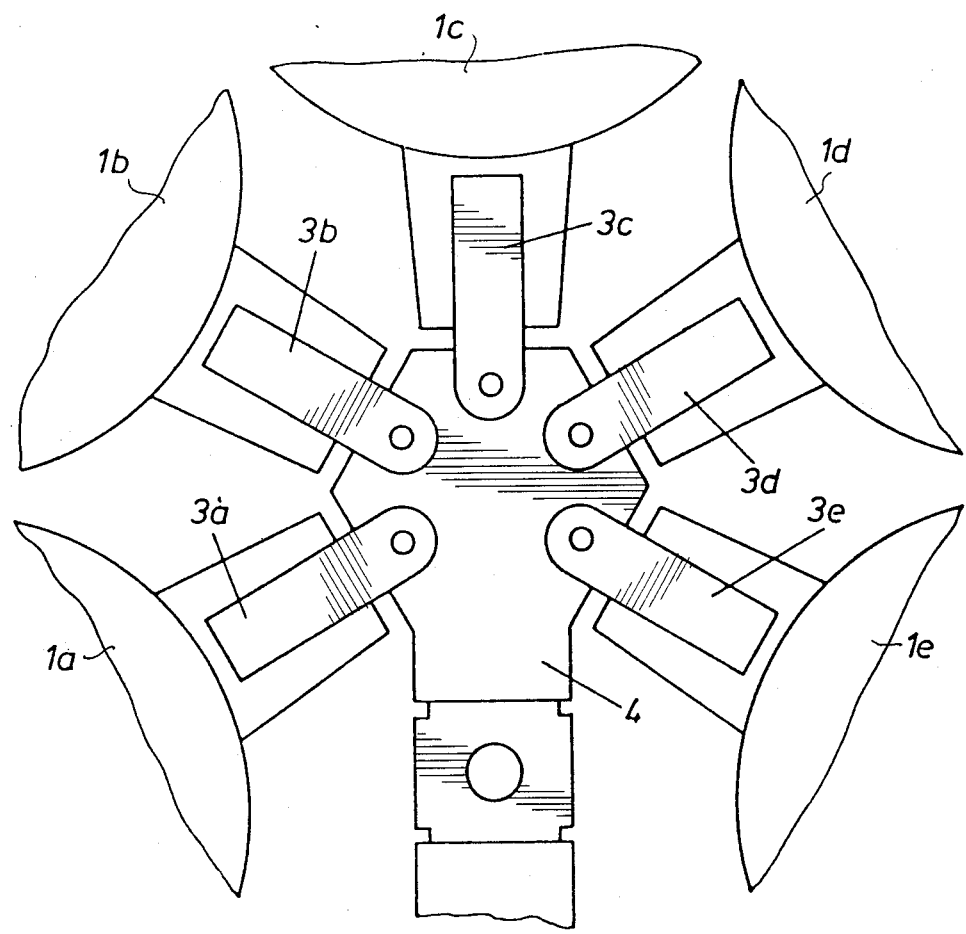

FIG. 5a shows an arrangement of two stationary vessels 1a and 1b which empty into a fixed spout or trough 3b for transferring molten glass to distribution system 4. FIG. 5b shows five fixed vessels 1a, 1b, 1c, 1d and 1e which are connected via fixed spouts 3a, 3b, 3c, 3d and 3e with the distributing system 4. The arrangement of FIGS. 5a and 5b illustrate a third basic embodiment of the invention wherein both the spouts and vessels are fixed with respect to one another.

Figure 6:
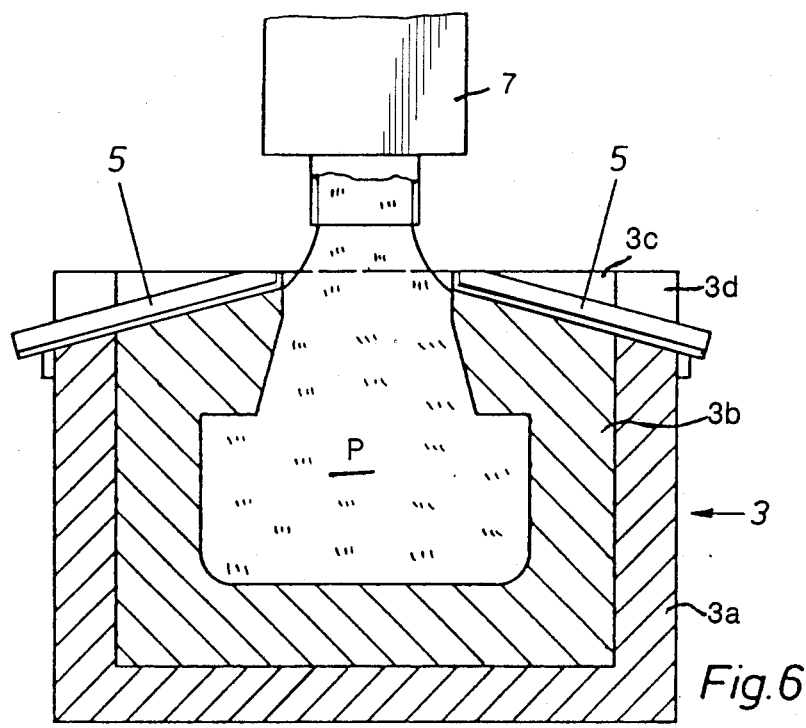
FIG. 6 is a side view showing partial vertical section through a pivoting spout and a complete vertical section through a distribution system.
Figure 7:
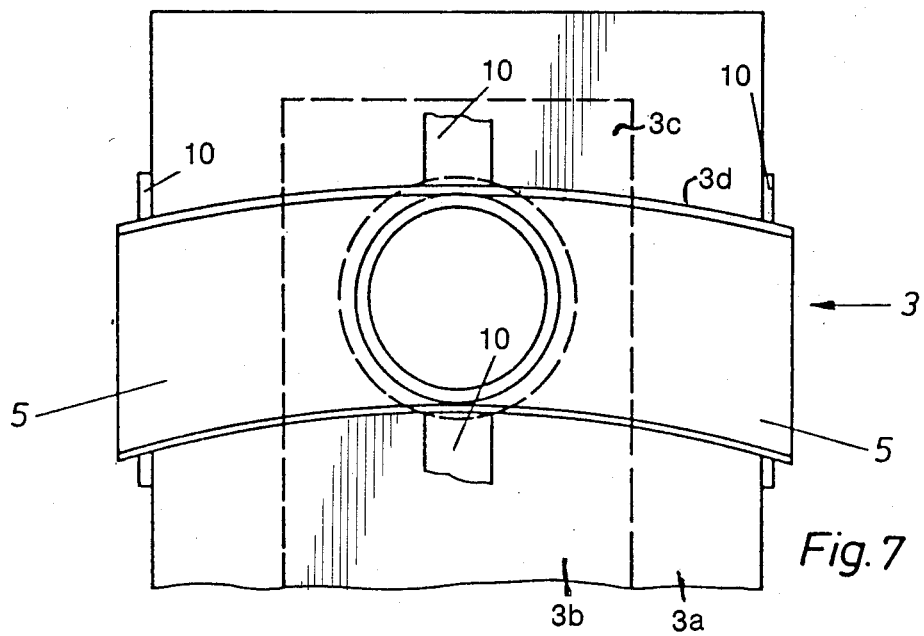
FIG. 7 is a top view of the pivoting spout of FIG. 6.

Referring now to FIGS. 6 and 7, where a single spout or trough 3 is shown in cross-section and top view, respectively, it is seen that each spout has an outer refractory casing 3a and a liner 3b which may be made of, for example, a refractory material such as fireproof clay. Typically, there is a space 3c formed between the top of the liner 3b and side walls of the casing 3a, which space tends to accumulate molten glass p which sloshes over the top of the liner 3b as the spout 3 is pivoted. This spilled glass must be removed so that it does not accumulate during repetition of the operation. This is effected by placing noble-metal troughs 5 in alignment with slots 3d in the vertical walls of the casing 3a. The troughs 5 are heated by heating flanges 10 so as to melt, or keep melted glass deposited thereon. The melted glass is simply channelled off the top of spout 3 by troughs 5, keeping the top of the spout clear of spilled molten glass.

Figure 8:
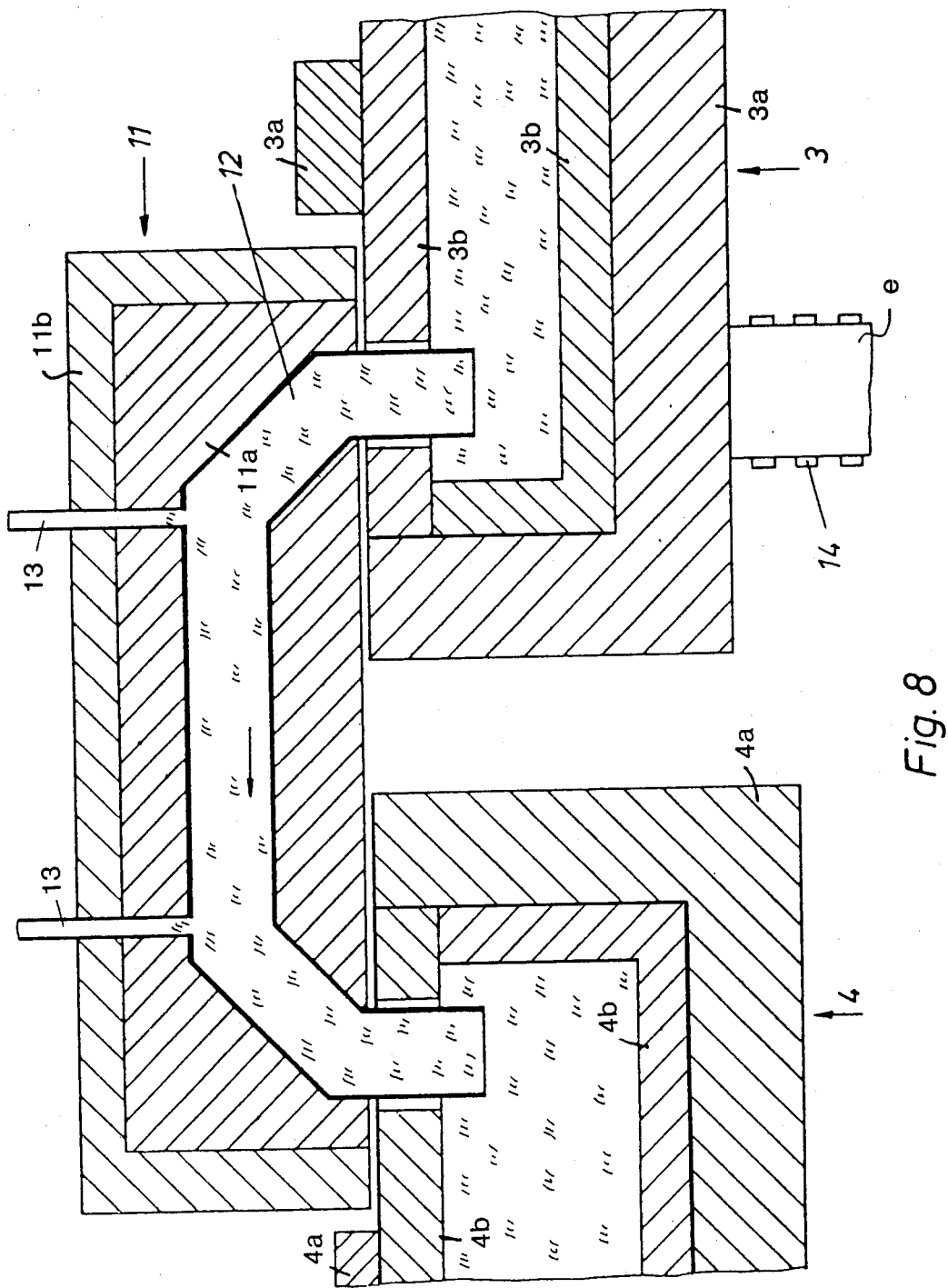
FIG. 8 is a side view showing a vertical section through a connecting joint.

FIG. 8 illustrates joint 11 which provides a conduit for connecting the spout 3 with the distributing system 4. The joint 11 includes a bridge pipe 12, preferably consisting of a noble metal. The bridge pipe 12 is evacuated when the installation is placed on stream by applying a vacuum to conduits 13. This causes the bridge pipe 12 to entirely fill with molten glass. A current feeding having slidable contacts 14 surrounds the pivot support e (See FIGS. 2-4) of the pivoting spout 3.

Considering the structure shown in FIG. 8 more specifically, the portion of spout 3 which is shown is the exit end of the spout as opposed to the entry end of the spout shown in FIGS. 6 and 7. Again, the spout is lined with refractory material 3b. The receiving end of the distributing system 4 is configured somewhat similar to the spout 3 in that it includes a casing 4a and a refractory lining 4b. The bridge pipe 12 is preferably surrounded by an insulation layer 11a disposed between the pipe and an outer metal casing 11b of the joint 11.

Figure 9:
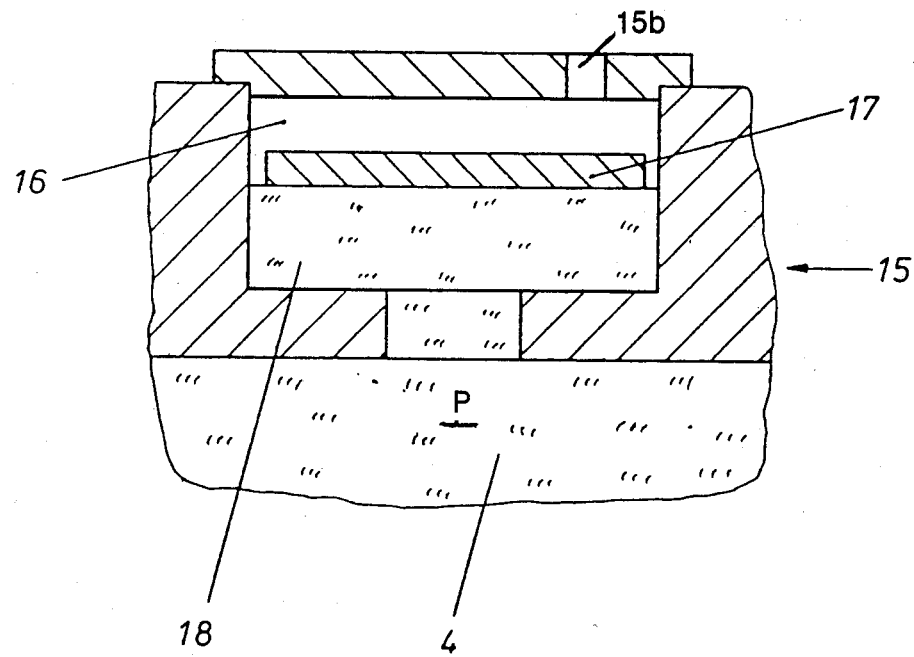
FIG. 9 is a side view showing vertical section through an equalizing tank.

FIG. 9 shows an equalizing tank 15 which is disposed above the distributing system 4 containing molten glass p. For delivering the necessary quantity of glass p it is necessary to keep the glass level in the distributing system constant during the time the vessels are switched and the spout is pivoeed. Collection of the glass in the equalizing chamber 15 is carried out by applying a vacuum to bore 15b so as to evacuate the space 16 above a quartz plate 17 and thereby urge the molten glass p into a space 18 located below the quartz plate 17. During delivery, the space 16 is exposed to excess pressure to thereby control the quantity of material in the distributor system 4. The information required for the control procedure is provided by a conventional glass level meter (not shown) which monitors the level of glass in the distribution section 4.

FIG. 10 illustrates a device 19 for cooling the glass to processing temperature. The glass surface is covered either by a floating quartz plate 21 of or by a noble-metal trough 22, so as to prevent troublesome vaporizations. Slides 23a, 23b, 24a, 24b, 25a and 25b, as well as water coolers 20 are arranged above the floating plate 21 or trough 22. The slides 23–25 are for the purpose of controlling cooling and heat transfer away from the molten glass p. The structure which is designated generally by the numeral 128 is simply indicative of downstream processing apparatus, which is conventional.

Figure 11A:
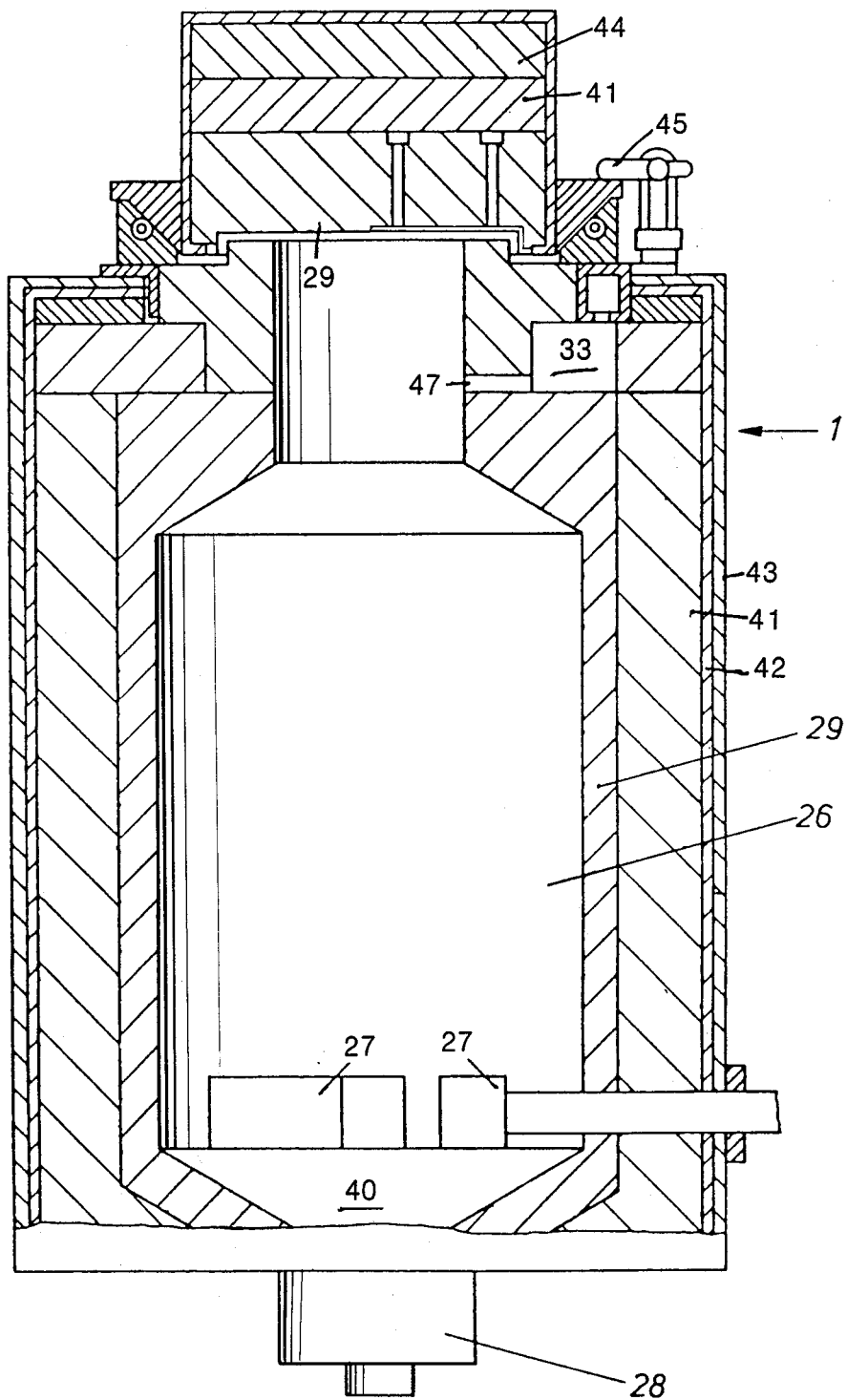
FIGS. 11a and 11b are side views showing vertical sections of one embodiment of a vessel in accordance with the instant invention.

FIG. 11a. is a vertical section through the vessel 1 according to this invention. Electrodes 27, which are coolable, are positioned adjacent to the bottom 40 of the cylindrical interior of the vessel. The support means, rotary drive mechanism, balancing mechanism and transmission of heating current are accomplished in a technical fashion and are performed by conventional means. A mixture such as cullet is charged into the vessel 7 either when stationary or revolving.

Considering the structure of FIG. 11a more specifically the configuration of the vessel 1 is generally similar to the configuration of the vessel 7 of FIG. 4 in that there is a chamber 26 for containing glass to be melted and refined, and a refractory lining 29. However, the vessel 1 of FIG. 11a further includes an insulating layer 41 of fireproof clay and a corrugated metal spacer 42 between the insulating layer 41 and outer casing 43 (see also FIG. 12). The vessel 1 includes a cover 44 which locked shut by a latch 45. At the top of the vessel there is a vent 47 which communicates with an opening 33 for the purpose of applying pressure or vacuum to the glass melt as will be described further hereinafter.

Figure 11B:
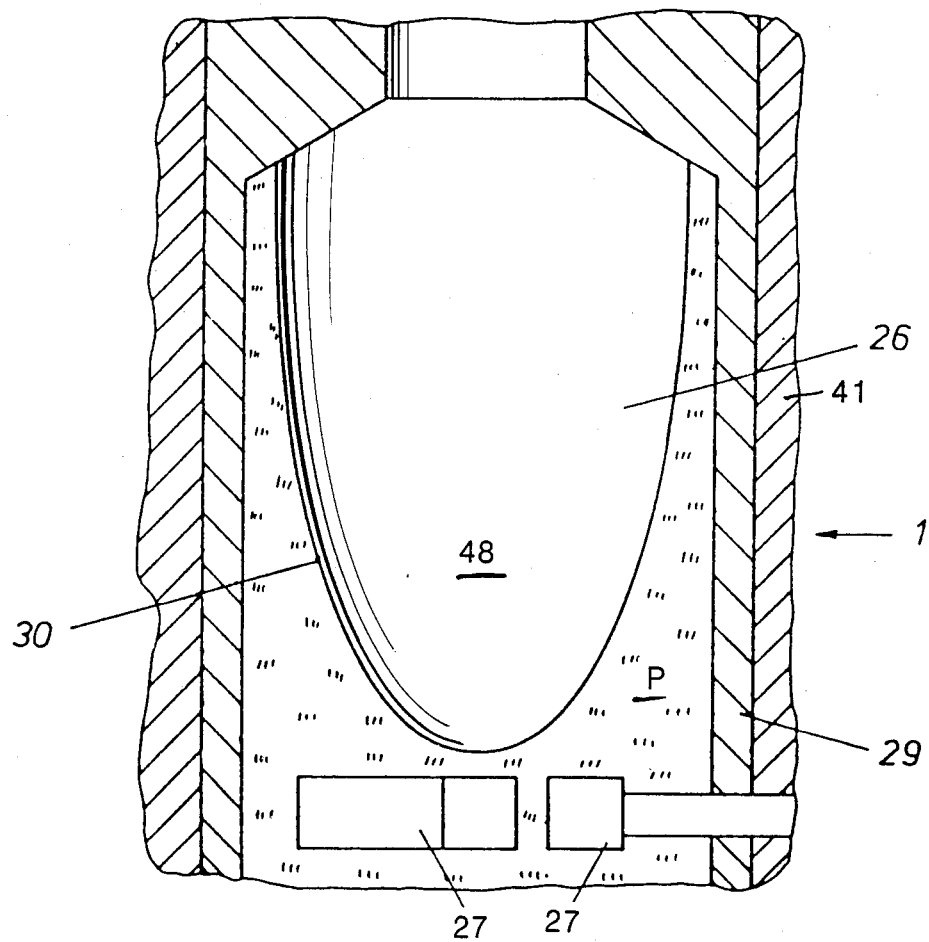

FIG. 11b shows a revolving vessel having a lining of the refractory material 29 which is protected from cooling too rapidly by of the glass layer p and a layer of insulation 41. Energy required for the fusing or melting the glass is introduced near the bottom of the vessel by energizing the electrodes 27. Preferably, the electrodes 7 are plate-shaped and extend vertically. As is seen in FIG. 11b as the vessel 1 rotates, a space 48 is formed as the molten glass is distributed to form parabolic surface 30 within the vessel.

Figure 12:
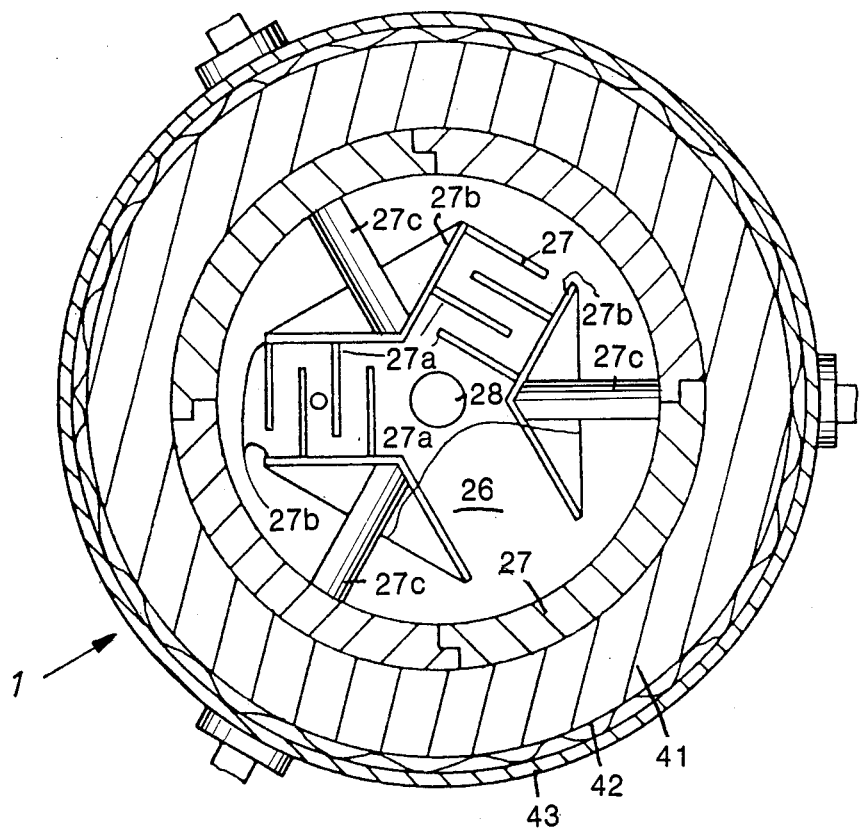
FIG. 12 is a top view showing a horizontal section of a vessel illustrating an electrode array within a vessel.

FIG. 12 is a horizontal section through the vessel 1 of Figs. 11a showing a possible configuration for the plate electrodes 27. The energy that is introduced must be distributed over the entire space of the vessel 1 so that there is no formation of local hot spots and the melting process proceeds everywhere at the same speed. This is particularly important toward the end of the melting process.

Considering the cross section of vessel 1 shown in FIG. 12 more specifically, the electrodes 27 include electrode plates 27a, electrode connecting elements 27b and electrode supports 27c. The electrode plates 27a are arranged in spaced relation on the connecting elements 27b and overlap the electrode plates on adjacent elements. The outlet opening 28 is beneath the electrodes 27 and a port 50 for injection, pressurization or other adjustments is provided in the bottom of the vessel 1.

Figure 13:
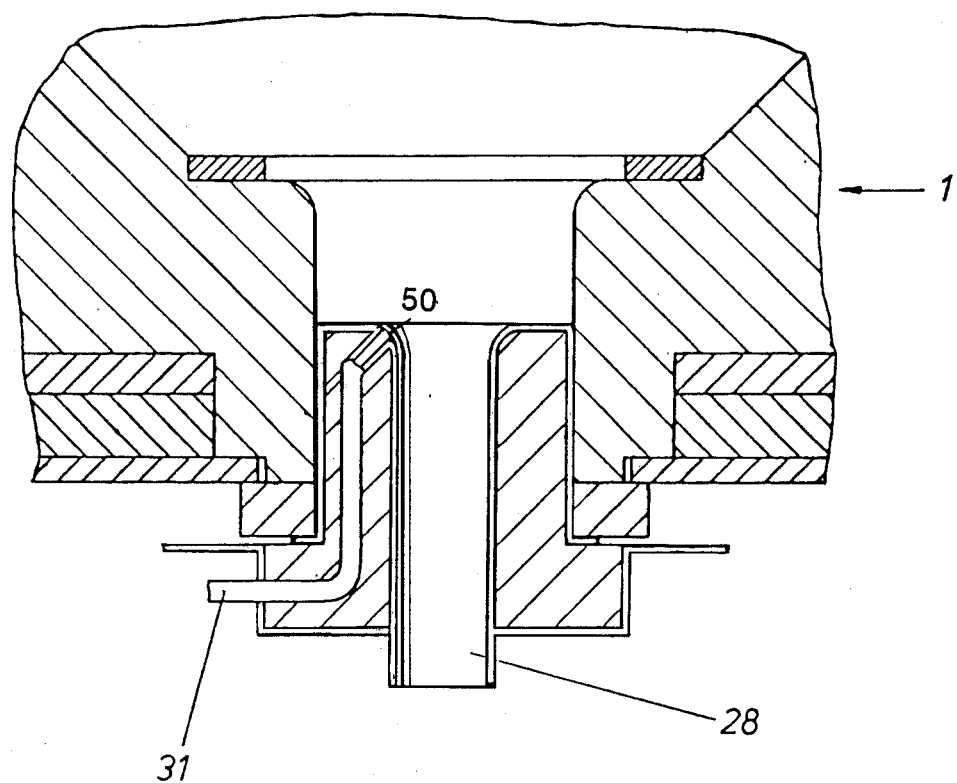
FIGS. 13 and 14 are side views showing vertical sections through an outlet port of a vessel illustrating the location of blast pipes.
Figure 14:
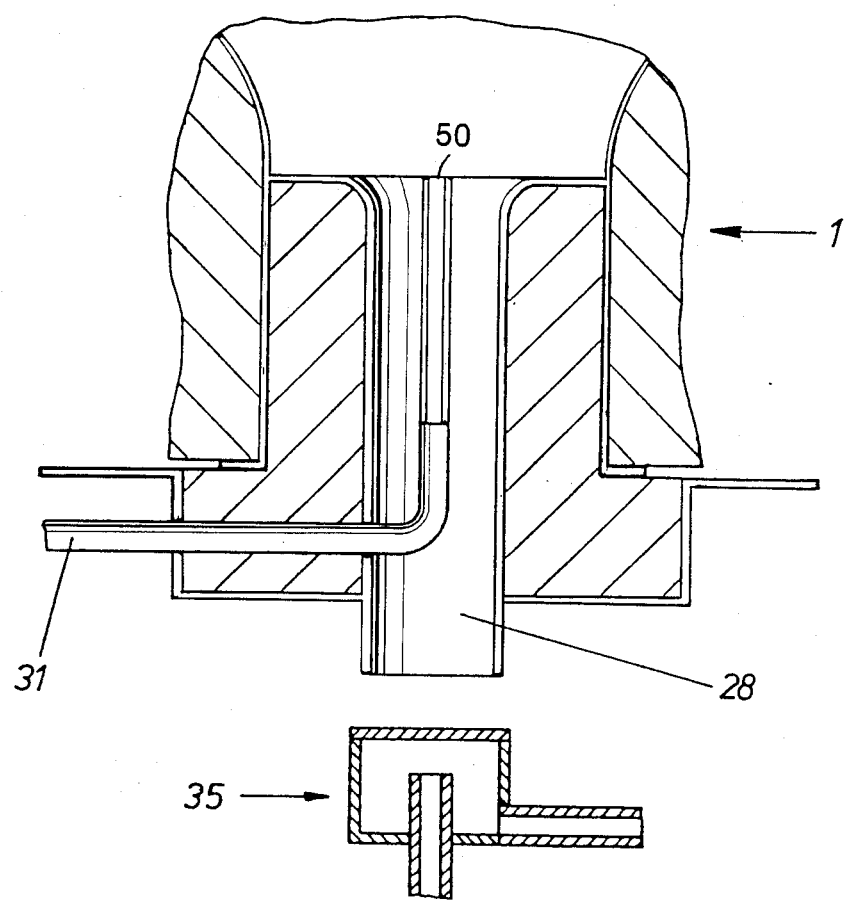
Figure 15:
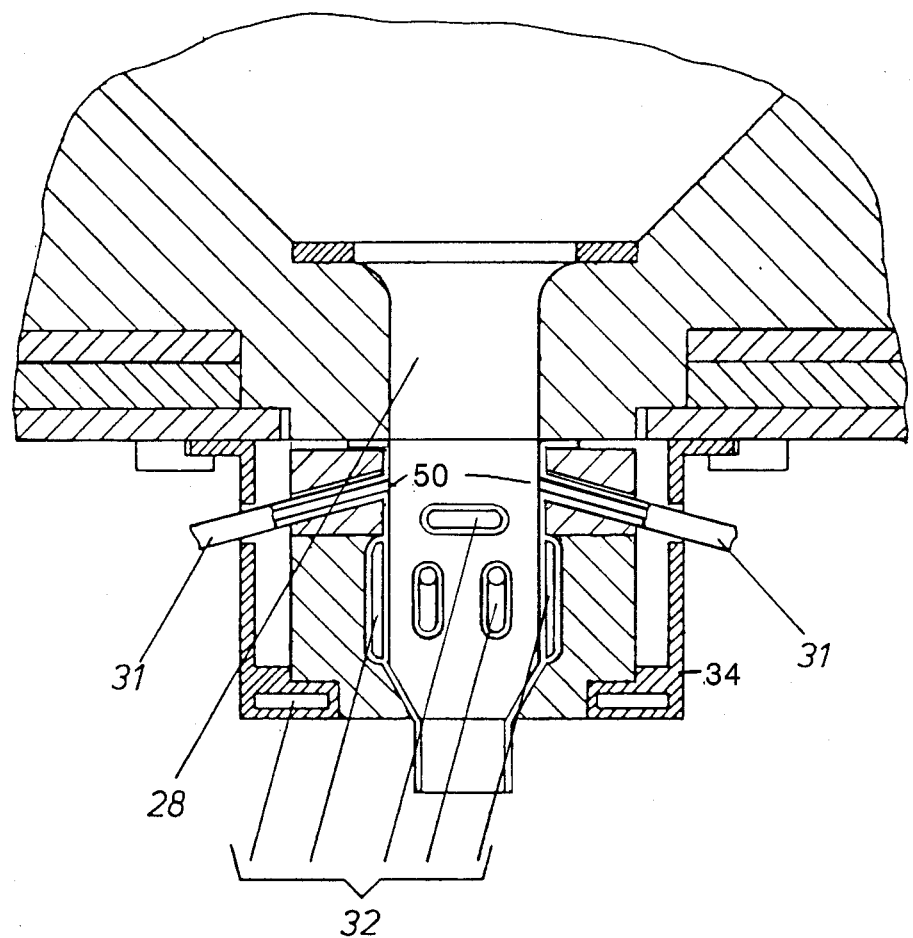
FIG. 15 is a side view showing vertical section through an outlet port of the vessel illustrating the location of cooling pipes.

If, at the energy densities present, convection is enhanced by thermal flow and radiation are inadequate, energy transport in the molten glass p is improved by a mechanically reinforced flow. This is effected by introducing a blast of an inert gas, for example nitrogen. Various embodiments of a blast pipe 31 used for this purpose and positioned adjacent to the outlet port 28 of the vessel 1 are shown in FIGS. 13, 14 and 15. The blast of inert gas causes more intensive intermixing which distributes any schlieren effects that may be present due to interaction between the melt and the refractory material 29. The mixing through of the melt and thus the acceleration of the dissolution of the mixture particles can also be promoted by varying the number of revolutions of the vessel and the direction of rotation.

Considering FIG. 13 more specifically, the blast pipe 31 is shown positioned with an opening 50 at the upper periphery of the outlet 28. Considering FIG. 14, the blast pipe 31 is shown concentric with the outlet 28 with opening 50 concurrent with the top of the outlet. Considering FIG. 15, blast pipes 31 are shown at a plurality of locations around the perimeter of the outlet intermediate the ends thereof.

The refining period is considerably reduced by subjecting the melt to centrifugal action. This is done by increasing buoyancy, i.e., ascending force and upward thrust of the melt and shortening the flow path of the melt. During centrifuging, the heating process is discontinued, or heating is reduced, resulting in only minor thermal currents. As soon as the acceleration of the melt is terminated, the bubble exit route is determined only by the resultant forces of gravity, and centrifugal acceleration, and by the geometries of the vessel and the paraboloid 30 (see Fig. 11b) formed by the action of centrifugal force on the melt.

Figure 16:
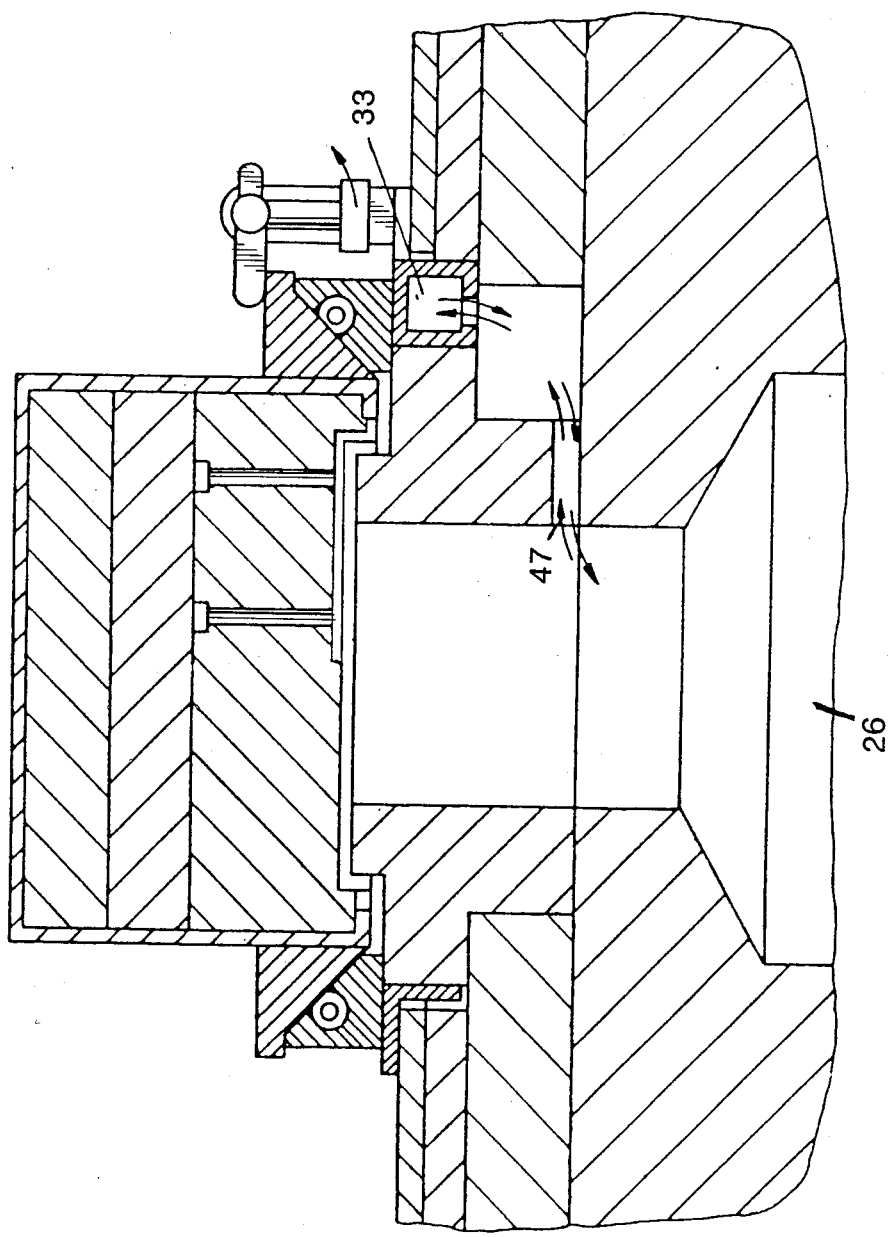
FIG. 16 is a side view showing a vertical section through a vessel illustrating a seal with pressure feed conduits.

If necessary, the glass in the vessel can be cooled by blowing air into the vessel via an inlet port 33 (see FIG. 16). The air cools the surface of the paraboloid 30 of molten glass formed in the interior 26 of the rotating vessel 1 (see FIG. 11b). By using the aforedescribed centrifuging process, the method can be performed with less refining agent then is normally used and, in certain cases, without any refining agent. Since there is less stress on the environment within the vessel 1; the desired degree of refinement of the molten glass can be achieved quickly by simply varying the number of revolutions and the time period of rotation.

To additionally exploit the advantages of a more rapid melting step, it is also feasible to operate with a vessel 1 that does not revolve. For this purpose, the vessel 1 is shallower so that the exit route of the bubbles in the vertical direction becomes short.

Figure 17:
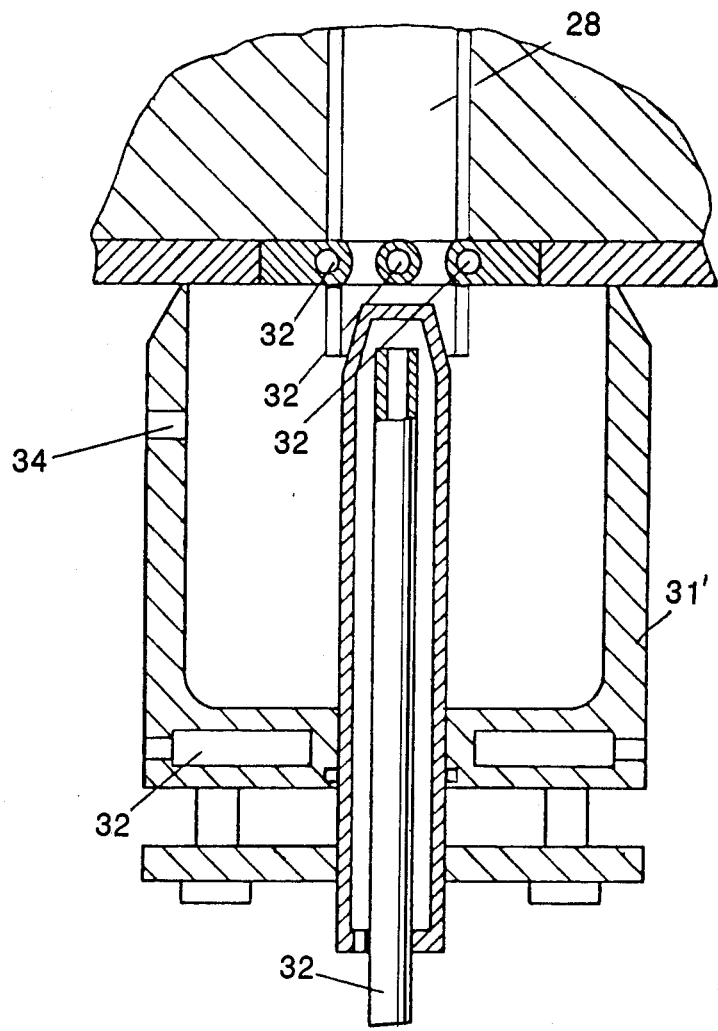
FIG. 17 is a side view showing a vertical section through an outlet port of a vessel illustrating cooling pipes and air feed conduits.

As is seen in FIGS. 13, 14 and 15, emptying of the vessel 1 takes place through the outlet port 28 provided in the bottom. The glass exit speed is controlled by either application of a vacuum or by excess pressure. This may be done through supply conduit 33 (see FIGS. 16 and 11a) which communicates with chamber 26 through port 47. Additionally, as is seen in FIG. 17, the discharge of the molten glass can be decelerated by means of applying counter pressure at the outlet 28 by introducing an air blast via the supply conduit 34 positioned in a sleeve 34' surrounding the open end of the outlet port 28.

The glass flow out of outlet port 28 is decelerated when a vacuum is applied to the interior 26 of the vessel 1 through port 47 of FIGS. 16 and 11a. The glass flow is then cut off by conventional means and sealed off either mechanically by a gate valve 35 (FIG. 14) which abuts the end of outlet port 28 or by freezing of the glass melt. As is seen in FIGS. 15 and 17, freezing of the melt is effected by passing coolant through conduits 32 positioned in proximity with the outlet port 28.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of molten glass for subsequent processing from batches of solid glass pieces by a series of melting, refining and discharging operations, comprising the steps of:
   providing a plurality of similar vessels for retaining the glass, each vessel having heating electrodes positioned adjacent the bottom thereof and closable opening in the bottom thereof for discharging the glass into a distribution system;
   performing all of said operations in a single vessel for each batch of glass:
   for each batch of glass, melting a mass of solid glass pieces comprising the glass for one batch by covering the electrodes of the vessel with the mass of solid glass pieces and heating the mass of solid glass pieces to produce a mass of molten glass;
   retaining the entire mass of molten glass for the one batch in a single vessel, and while keeping the electrodes completely immersed in the mass of molten glass in the single vessel, performing the refining step by rotating the vessel at a speed sufficient to produce a parabolic surface on the mass of molten glass through which parabolic surface occluded gas bubbles escape as the glass is refined;
   stopping rotation of the vessel after sufficient refining, and
   discharging the entire batch of refined glass after stopping the vessel.

2. The process of claim 1, further including the steps of:
   feeding the batch of refined glass via the distribution system to further processing stations after discharging the batch of refined glass from the vessel; and
   storing at least a portion discharged molten glass in an equalizing chamber connected to the distribution system to maintain the amount of glass in the distribution system at a sufficient level during the period of time between discharging different vessels.

3. The process of claim 2, including the step of connecting vessels and the refining vessels are with one another by movable troughs.

4. The process of claim 2, wherein the discharging step is performed by discharging refined glass into at least one spout connected to a distribution system.

5. The process of claim 4, wherein each vessel has a spout integral therewith.

6. The process of claim 4, characterized in that the vessels are fixed and the spout is movable with respect to the vessels.

7. The process of claim 4, wherein vessels are movable and the spout is fixed with respect to the vessels.

8. The process of claim 4, further including the step of cooling the melt while the melt is in the distributing system.

9. The process of claim 1, further including the step of controlling efflux velocity of the glass during discharge of the glass from the vessels.

10. The process of claim 9, wherein the efflux velocity of the glass is controlled by the application of pressure.

11. The process of claim 1, further including the step of blowing an inert gas into the glass melt during fusing thereof.

12. The process of claim 1, wherein the glass melt is discharged through an outlet port which is sealed mechanically.

13. The process of claim 12, wherein the mechanized seal is effected by freezing the glass melt.

* * * * *